L. E. RIVOT.
Roasting Ores.
No. 78,831.
Patented June 9, 1868.
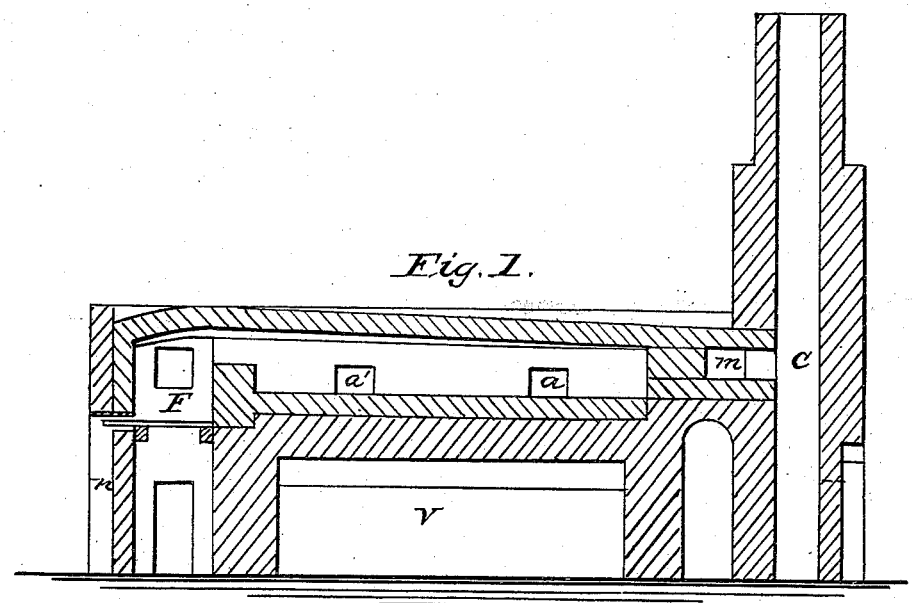
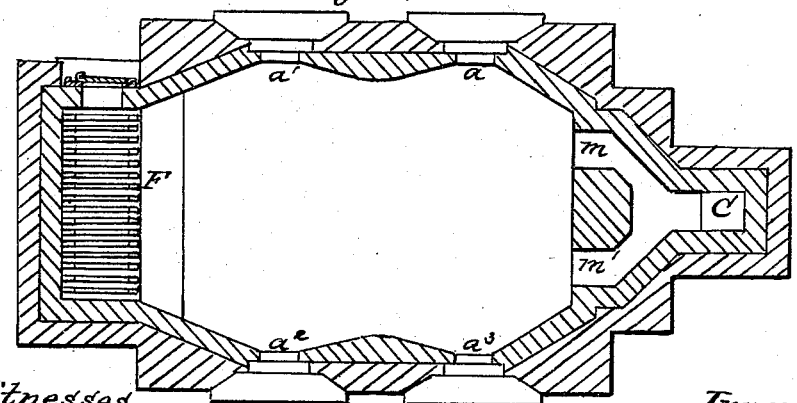

United States Patent Office.

LOUIS EDWARD RIVOT, OF PARIS, FRANCE, ASSIGNOR TO JACQUES GAILLARDSON, OF SAN FRANCISCO, CALIFORNIA.

*Letters Patent No. 78,831, dated June 9, 1868.*

IMPROVED PROCESS OF TREATING GOLD AND SILVER ORES.

*The Schedule referred to in these Letters Patent and making part of the same.*

TO WHOM IT MAY CONCERN:

Be it known that I, LOUIS EDWARD RIVOT, of Paris, in the Empire of France, have invented a certain new and improved Process of Treating Gold and Silver Ores; and I hereby declare the following to be a full, clear, and exact description of the same.

My invention relates to the process of treating gold and silver ores, for which Letters Patent of the United States were granted me on the 31st May, 1864, and on the 28th January, 1868. The experiments and researches I have made in order to perfect my original process, have demonstrated the possibility of rendering more rapid and economical, at least in the majority of cases, the fundamental and most important part of the process, to wit, the roasting of ores mixed with pyrites by superheated steam.

The improvement which is the subject of the present patent consists in mixing gold and silver ores, before being submitted to the action of superheated steam, with oxide of iron in lieu of pyrites. For this purpose there may be employed, according to the locality of the works, either pyrites previously roasted in the open air or iron ores.

This modification requires no change in the principle of my process, nor in the apparatus described in the Letters Patent above mentioned. After being roasted by steam, the gold and silver are reduced to a metallic state, and are extracted, with the aid of mercury, by amalgamation, and without the intervention of any reagent.

The modification which I have made in my process is applicable principally to gold and silver ores which contain a considerable proportion of pyrites, and to ores which must be mixed with pyrites in order to be treated as described in my patent of May 31, 1864; for example, gold ores containing a large quantity of arsenical pyrites, grey copper ores, silver ores, accompanied by sulphur or antimony.

Those skilled in the art to which this invention pertains, will understand without further explanation what gold and silver ores it is proper to heat with superheated steam without the mixture of pyrites or of oxide of iron, or with the addition of pyrites, or even with the addition of oxide of iron. It will only be necessary, therefore, to state the chemical reactions which take place when superheated steam is caused to act upon gold and silver ores mixed with a suitable proportion of pyrites, for which reference may be had to my patent of May 31, 1864, and when, on the contrary, ores mixed with a sufficient proportion of oxide of iron are subjected to the action of superheated steam; in the latter case, the steam and the oxide of iron act simultaneously upon the sulphurets, sulpho-arsenites, sulpho-antimonites, &c., contained in the ores.

The action of the steam produces sulphuretted hydrogen, arsenious acid, oxide of antimony, and metallic oxides, in reducing the gold and silver to a metallic state.

The oxide of iron acting as an oxidizing-agent of moderate energy, produces, likewise, sulphurous acid, arsenious acid, oxide of antimony, and metallic oxides in reducing the gold and silver in the ores to a metallic state. It also gives rise to a certain proportion of arsenite and antimonite of iron, but these compounds do not hinder in any degree the process of amalgamation.

The mixture of oxide of iron with the ores has, therefore, this advantage, that in a great measure it takes the place of steam, and consequently renders the operation much shorter and more economical. I would add, that the mixture of oxide of iron favors the formation of silicates of gold and silver at a temperature above dull red, which is therefore to be avoided.

The volatile products which pass out from the steam-roasting furnace vary according to the nature of the ores which are used, and according to the quantity of oxide of iron mixed with the ores. Suppose, for instance, that the ore to be treated is a grey antimonial copper, and that there is mixed with it a sufficient quantity (about its equal in weight) of oxide of iron, in order to as much as possible shorten the operation of roasting with steam.

The volatile products in this case will be, a little sulphur arising from the action of sulphurous acid upon the sulphuretted hydrogen, sulphurous acid, oxide of antimony, arsenious acid. The closing of the operation can be determined by the following indications:

First. White fumes will no longer be deposited upon a cold surface, introduced at the end of the furnace.

Second. Water condensed on a cold surface at the end of the furnace will no longer redden paper colored blue by vegetable dye.

These two tests indicate that the ore will throw off no more oxide of antimony, arsenious acid, and sulphurous acid.

As above stated, my present invention consists in mixing, with gold and silver ores, a suitable proportion of oxide of iron, before subjecting them to the action of superheated steam. To this end I employ, according to circumstances, iron ore or roasted pyrites; the latter should have the preference, when it is possible to procure at a moderate cost auriferous pyrites.

When iron ore is employed, the different operations are substantially the same as those described in my patent of 31st May, 1864. The only difference is, that instead of mixing the gold and silver ores with pyrites, the ores are mixed with a suitable proportion of iron ore.

When pyrites are employed, one operation, in addition, is necessary, viz; the roasting in the open air of the pyrites. The series of operations will in this case be as follows:

First, the nearly-complete roasting of the pyrites in large heaps or in cases, or in reverberatory furnaces heated by suitable fuel.

Second, pulverization and mixture of the roasted pyrites with gold or silver ore.

Third, roasting, with superheated steam, the ores thus mixed with roasted pyrites.

Fourth, direct amalgamation without the intervention of any reagent.

Fifth, separation of the amalgam.

Sixth, compression of the amalgam.

Seventh, distillation of the mercury.

Eighth, reduction of the gold and silver, and separation of the two metals.

The partial or nearly-complete roasting of the pyrites is an operation well known in metallurgy, and I prefer to make use of no new apparatus for this purpose. That mode of roasting which appears to be the most fitting and economical, may be adopted. The object to be attained is to almost completely oxidize the sulphurs contained in the pyrites by avoiding as far as possible the formation of sulphates, and, consequently, limiting in a suitable degree during the whole operation the supply of air to the pyrites. Great care should be observed not to raise the temperature above a dull red, in order to preserve the gold and silver contained in the pyrites in condition to be amalgamated with facility.

I have already stated that the roasting may be effected in large heaps, in cases, or in reverberatory furnaces. In further illustration of my invention, however, I have represented, in figs. 1 and 2 of the accompanying drawings, a reverberatory furnace heated by wood, in which, during twenty-four hours, four tons of pyrites, in two charges, may be roasted.

Figure 1 is a vertical section through the axis of the furnace.

Figure 2 is a horizontal section taken a little below the level of the bridge.

The sole of the furnace has a plane and horizontal surface four (4) metres in length, and three (3) metres in extent at its widest part.

The charging of the pyrites is effected through the four doors, $a\ a^1\ a^2\ a^3$, or through a hopper placed over the arch, if the latter arrangement should be found more convenient. Through the four doors the rabbling is effected during the process of the roasting, and the pyrites are discharged at the termination of the operation.

The flames leave the fire-chamber F, follow the arch, and are conducted through the flues $m\ m'$ to the chimney C, the height of which is about eight (8) metres.

The draught of the furnace is regulated by a register placed on the upper part of the chimney, and by the brick wall $n$, which closes the ash-pit. This wall is provided with rectangular openings, closed by movable or sliding doors.

The arched space V, under the sole, may be made to serve as a receptacle for the roasted pyrites. I have not thought it necessary, however, to represent the well-known arrangements which permit the chamber V to be utilized for this purpose.

It will, in general, be found preferable to cause the roasted pyrites to drop directly into cast-iron wheelbarrows, in which they can be at once transported to the place where they are to be stored or used.

The operation is conducted in very nearly the same manner as the roasting of Swansea pyritous copper ores. When the furnace is at a temperature a little above dull red, the charge, of two (2) tons of pyrites, is introduced, and spread evenly upon the sole.

The pyrites become heated and burn at the surface upon contact with the oxidizing-flames. The fire is then slowly fed, and the entrance of air through the wall $n$ is regulated in such manner that the combustion shall not effect agglomeration of the pyrites. At regular intervals, from hour to hour, the pyrites should be worked with rabbles, in order to renew the surfaces in contact with the oxidizing-gases to break the lumps, and to make uniform the process of the oxidation. In proportion as the oxidation becomes more advanced, the fire is somewhat increased, and air is admitted in greater quantity. The roasting is considered as completed when every part of the charge has a reddish tint, and when the odor of the disengaged sulphurous acid becomes almost insensible, and about twelve (12) hours are needed in order to arrive at this result. The furnace is then emptied, and a new charge is introduced.

In the second operation, viz, the pulverization and mixture of the pyrites with the ores, the proportion of pyrites to be employed will vary according as the roasting of the pyrites is more or less perfect, according to the nature of the gold and silver ores, and in accordance with special conditions and requirements. The proportion must be determined by the cost of the pyrites, the expense of transportation, and other like considerations, regard being had at the same time to the object in view in mixing the roasted pyrites with the ores, which is to render more rapid the action of the steam.

In all cases it is necessary that the ores should be thoroughly and intimately mixed with the roasted pyrites. This mixture may be effected at the same time that the ores are pulverized, or even after pulverization, in any apparatus suitable for the purpose.

The treatment with superheated steam of the ores thus mixed with roasted pyrites, is conducted in the manner and in the apparatus described in the Letters Patent above mentioned as having been heretofore granted to me. The volatilized products are different, as I have already indicated, and the operation is terminated much more speedily than has heretofore been practicable.

The remaining operations are in all respects the same as those described in my patent of 31st May, 1864.

Having now described my invention, and the manner in which the same is or may be carried into effect, what I claim, and desire to secure by Letters Patent, is—

1. The roasting, by means of superheated steam, of auriferous and argentiferous ores, when previously combined or mixed with oxide of iron, substantially as set forth.

2. The roasting of auriferous and argentiferous ores by mixing therewith oxide of iron, combined with iron or roasted pyrites, and then submitting the whole to the action of superheated steam, substantially as set forth.

In testimony whereof, I have signed my name to this specification before two subscribing witnesses.

L. E. RIVOT.

Witnesses:
  G. RICHARD,
  JAMES HAND.